United States Patent [19]

Geyer

[11] 4,397,527
[45] Aug. 9, 1983

[54] APPARATUS FOR USE IN CORRECTING BEAM ANAMORPHICITY BY VECTOR DIFFRACTION

[75] Inventor: Frederick F. Geyer, Rochester, N.Y.

[73] Assignee: Eastman Kodak Company, Rochester, N.Y.

[21] Appl. No.: 238,184

[22] Filed: Feb. 26, 1981

[51] Int. Cl.$^3$ ............................................. G02B 13/08
[52] U.S. Cl. .............................. 350/400; 350/162.11; 369/112
[58] Field of Search ............. 350/15, 19, 400, 162.11; 369/112

[56] References Cited

U.S. PATENT DOCUMENTS 3,914,057 10/1975 Smith et al. .......................... 350/15
4,235,507 11/1980 Kataoka et al. ...................... 350/19

OTHER PUBLICATIONS

E. Wolf, Proc. R. Soc. London, Ser. A:253, 349 (1959) "Electromagnetic Diffraction in Optical Systems–I. An Integral Representation of the Image Field" pp. 349–357.

B. Richards and E. Wolf, Proc. R. Soc. London, Ser. A:253, 358 (1959) "Electromagnetic Diffraction in Optical Systems–II. Structure of the Image Field in an Aplanatic System" pp. 358–379.

Primary Examiner—R. A. Rosenberger
Attorney, Agent, or Firm—John D. Husser

[57] ABSTRACT

Certain sources of optical radiation, such as diode lasers, emit an anamorphic beam of radiation that is linearly polarized along the major axis. The present invention provides optical apparatus that corrects for such beam anamorphicity through the use of vector diffraction effects.

21 Claims, 15 Drawing Figures

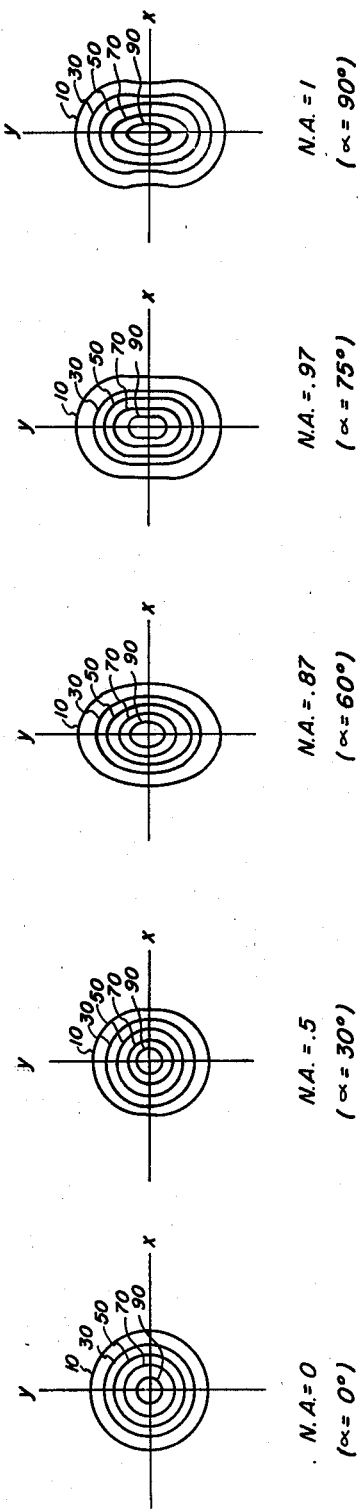

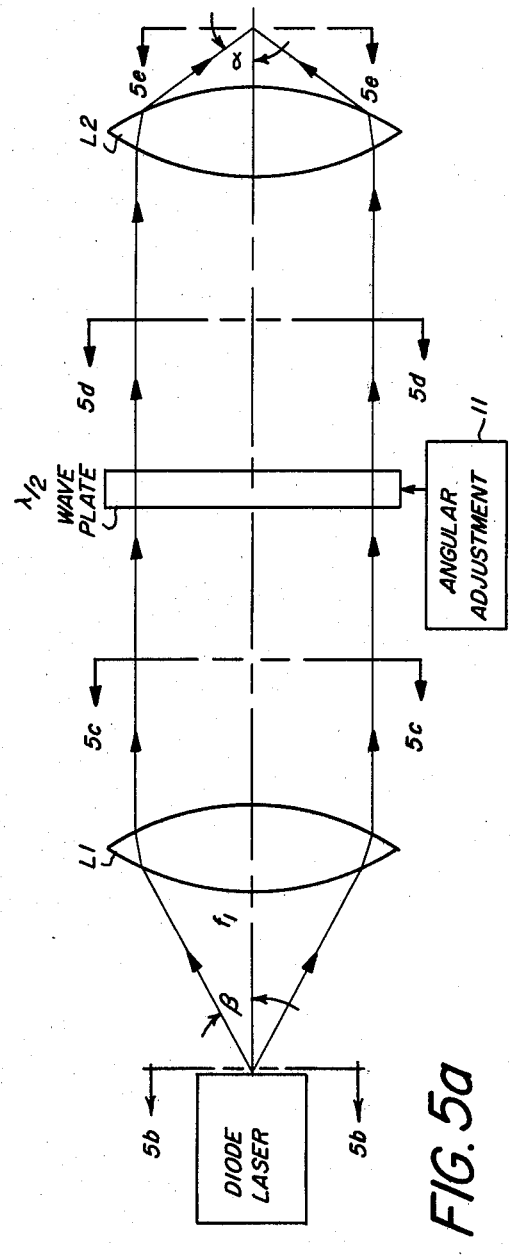
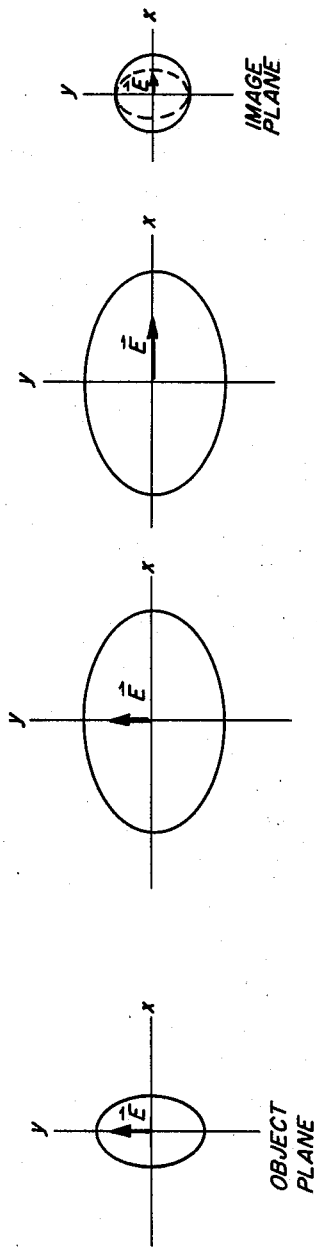
FIG. 5a
FIG. 5b
FIG. 5c
FIG. 5d
FIG. 5e

APPARATUS FOR USE IN CORRECTING BEAM ANAMORPHICITY BY VECTOR DIFFRACTION

FIELD OF THE INVENTION

The present invention relates to optical apparatus for use in correcting the anamorphicity of a beam of radiation produced by a diode laser, or other source of similar radiation.

DESCRIPTION RELATIVE TO THE PRIOR ART

A diode laser is a semiconductor light source that emits coherent radiation. Diode lasers are generally smaller, more efficient and consume less power than conventional gas or solid state lasers. Diode lasers possess a further advantage in that they can be modulated at very high speeds. As a result of these features, diode lasers are finding widespread application in such areas as fiber optic communications, video disc playback systems, printers, optical ranging devices, etc. A serious drawback associated with the use of a diode laser is that its output beam is anamorphic, i.e., the cross section of the output beam has an elliptical contour. This anamorphicity is a result of the fact that the radiation from a diode laser is emitted from a planar junction and thus suffers more diffraction in a direction perpendicular to the plane of the junction than in a direction parallel to the plane of the junction.

The anamorphicity of a diode laser beam is generally measured in terms of a pair of beam divergence angles which specify the angles at which the output beam diverges from the diode laser in a plane perpendicular to the plane of the diode junction and in a plane parallel to the plane of the diode junction. As a typical example, the beam divergence for the HLP3000 diode laser manufactured by Hitachi Corporation is 25° (parallel to junction) X 35° (perpendicular to junction). (These angles are measured at the half power points of the diode laser output beam.)

In many applications, it is desired to focus the output beam of a diode laser into a small spot having a generally circular cross section. Because of the anamorphicity of the diode laser output beam, however, the focusing of such a beam results in a spot which has an elliptical contour. It is the general practice to correct for the elliptical nature of the focused spot by using a cylindrical lens system, or by using a prism beam expander (which can be considered as a special case of a cylindrical lens). Specifically, the cylindrical lenses are arranged such that more optical power is introduced along the plane of widest beam divergence than in the plane of narrow beam divergence. Such cylindrical optical systems are discussed in P. Gunter et al, "Second-harmonic generation with $Ga_{1-x}Al_xAs$ lasers and $KNbO_3$ crystals", Appl. Phys. Lett. 35(6), Sept. 15, 1979 and Bartolini et al, "Diode Laser Optical Recording Using Trilayer Structures", Journal of Quantum Electronics, January, 1981. The use of cylindrical lenses in an optical system, however, causes the alignment of the optical components to be extremely critical, thereby making the optical system more difficult (and costly) to manufacture and operate.

An alternative method of correcting the anamorphicity of a diode laser output beam is disclosed in U.S. Pat. No. 4,235,507. The method disclosed therein involves the overfilling of the entrance pupil of the lens which is used to focus the laser radiation to a spot. As a result of overfilling the entrance pupil, a diffraction limited lens will, in the scalar approximation, produce a diffraction limited image in the focal plane which approximates a circular spot. A serious drawback of such a method, however, is that the overfilling of the entrance pupil results in a significant percentage of the usable radiant power being wasted.

SUMMARY OF THE INVENTION

The present invention provides optical apparatus for use in correcting the anamorphicity of a beam of coherent radiation that is linearly polarized along its major axis, such as is produced by a diode laser. Unlike the prior art system discussed above, the disclosed optical apparatus does not require the use of cylindrical optical elements.

In accordance with a presently preferred embodiment, means are provided for collimating the anamorphic beam of optical radiation, and for rotating the direction of polarization of the collimated beam of radiation. An optical lens having a numerical aperture greater than about 0.5 is provided for focusing the polarization rotated, collimated beam of radiation to a spot. This optical system, as described in detail below, produces vector diffraction effects which reduce the anamorphicity of the focused spot.

BRIEF DESCRIPTION OF THE DRAWINGS

In the detailed description of the preferred embodiments of the invention presented below, reference is made to the accompanying drawings in which:

FIGS. 4a–4e are diagrams illustrating the effects of vector diffraction as a function of the numerical aperture of the lens system; and FIGS. 5a–5e are diagrams which illustrate the concept of the present invention wherein vector diffraction effects are used to correct the anamorphicity of a diode laser output beam.

DETAILED DESCRIPTION OF THE PREFERRED EMBODIMENTS

Figure 1:
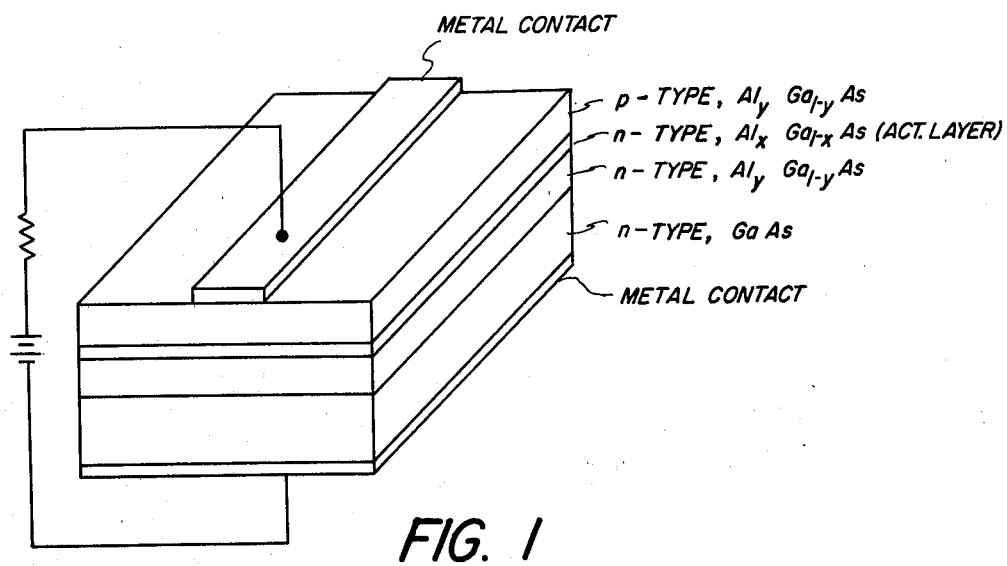
FIG. 1 shows the structure of a conventional diode laser.

A diode laser is a semiconductor device that is typically comprised of layers of gallium arsenide (GaAs) and aluminum gallium arsenide (AlGaAs) crystals, as shown in FIG. 1. When a forward current is passed through the device, injected carriers recombine within a crystal layer referred to as the "active layer" and emit radiation. In the device shown in FIG. 1, the active layer is comprised of n-type $Al_xGa_{1-x}As$. The wavelength $\lambda$ of emitted radiation is determined by the relation $$hc/\lambda = E_g,$$

where h is equal to $6.63 \times 10^{-34}$ joule-seconds (Planck's constant), c is the velocity of light ($3 \times 10^8$ meters per second), and $E_g$ is the band gap energy of the active layer.

In order for lasing action to take place, two conditions must be satisfied. First, a sufficiently high concentration of carriers must be injected into the active layer to induce population inversion. This is accomplished through the use of a double heterojunction structure in which the n-type $Al_xGa_{1-x}As$ active layer is sandwiched between n- and p-type $Al_yGa_{1-y}As$ layers (see FIG. 1). The mole fraction y of the sandwiching layers is chosen to be greater than the mole fraction x of the active layer, thereby producing a wider band gap (and lower index of refraction) in the sandwiching layers than in the active layer. Carriers injected into the active layer, therefore, are accumulated within the active layer because of the resulting potential barriers which exist at the interfaces of the active layer and the sandwiching layers.

The second condition required for lasing is optical feedback. Optical feedback is provided by forming (usually by cleaving) a smooth, planar surface along both ends of the active layer. Because the refractive index of the active layer is about 3.6, an index mismatch exists between the active layer and air (index of 1.0), thereby producing a "mirror" at each end of the active layer which has a reflectivity (due to fresnel reflection) of about 0.3. As a result, enough of the radiation emitted within the active layer is reflected back and forth between the mirror end surfaces to produce sufficient optical feedback for lasing action. It should be noted that radiation emitted within the active layer does not escape into the sandwiching layers because the sandwiching layers have a lower refractive index than the active layer, thereby causing the active layer to be an efficient optical wave guide.

Unlike gas or solid state layers which produce an output beam having a generally circular cross section, diode lasers produce an output beam that is anamorphic. As noted above, the anamorphicity is attributable to diffraction effects which occur as radiation leaves the active layer of the diode laser. Because the active layer is generally planar in configuration (typically on the order of 0.1 microns in thickness and several microns wide), radiation is diffracted more severely in a direction perpendicular to the active layer than in a direction parallel to the active layer. As a result, the output beam of a diode laser has greater beam divergence in a plane perpendicular to the active layer than in a plane parallel to the active layer.

Figure 2:
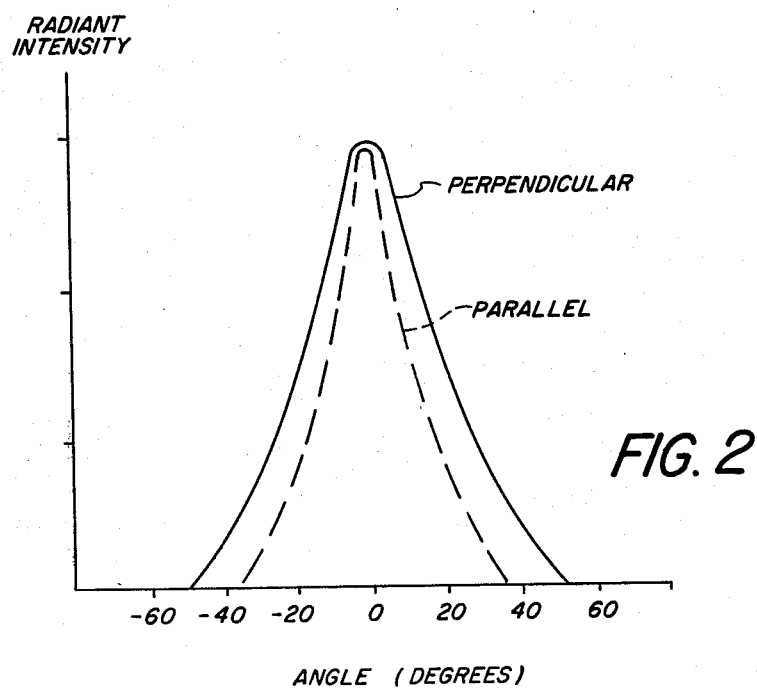
FIG. 2 shows the radiant intensity distribution as a function of divergence angle for a typical diode laser.

FIG. 2 shows a plot of the radiant intensity of the output beam of a typical diode laser as a function of the angle at which the beam diverges (i.e., fans out) as it leaves the diode laser. Two such curves are shown, one representing beam divergence in a plane perpendicular to the plane of the active layer (solid line), the other representing beam divergence in a plane parallel to the active layer (broken line). For any given radiant intensity, it is seen that the divergence angle is greater in the plane perpendicular to the active layer than in the plane parallel to the active layer. As discussed above, the anamorphic nature of the output beam of a diode laser poses serious problems in many applications.

Another property of the radiation produced by a diode laser that is important to an understanding of the present invention is the polarization state of the emitted radiation. Specifically, a diode laser emits radiation which is linearly polarized along a direction that is parallel to the plane of the active layer. As a result, the polarization vector (hereinafter denoted by E) is aligned along the major axis of the anamorphic output beam at the face of the diode laser. (It should be noted that at the face of the diode laser, the major axis of the spot is aligned parallel to the plane of least beam divergence.)

Figure 3A:
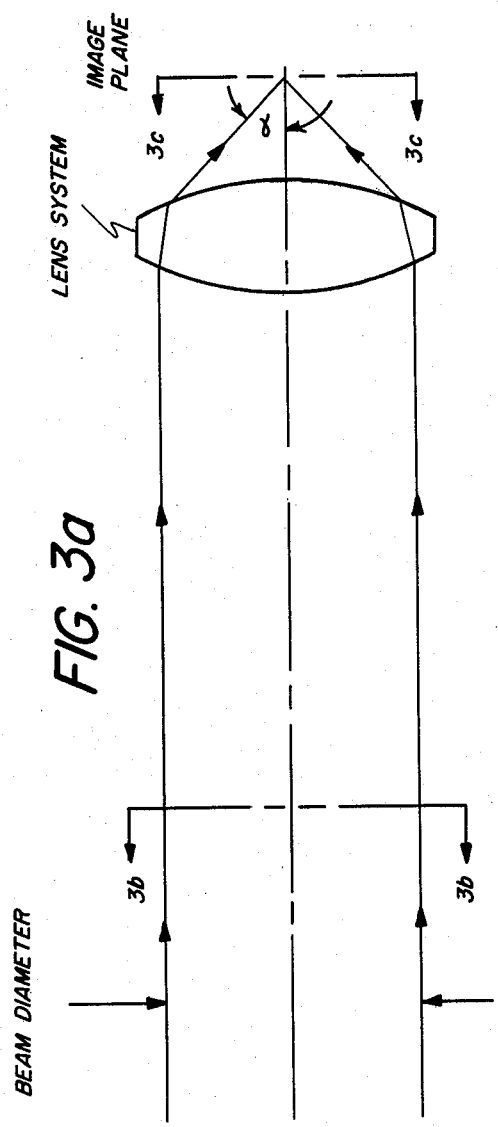
FIGS. 3a–3c illustrate a phenomena, known as vector diffraction, which occurs when a beam of linearly polarized, collimated radiation is imaged by a well-corrected lens system.
Figure 3C:
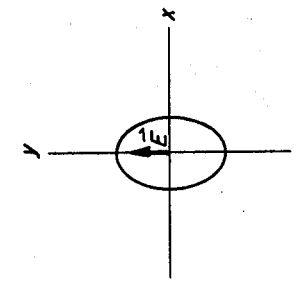
Figure 3B:
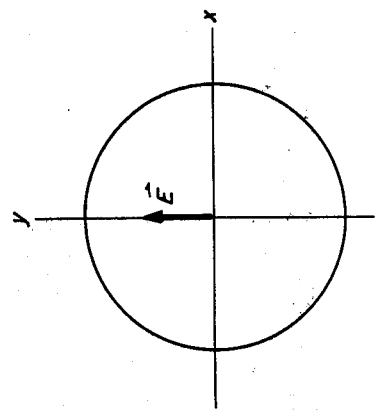

The present invention makes use of a phenomenon known as "vector diffraction". The theoretical principles involved in vector diffraction are set forth in the following articles: E. Wolf, Proc. R. Soc. London, Ser. A:253, 349 (1959); B. Richards and E. Wolf, Proc. R. Soc. London, Ser. A:253, 358 (1959). The principles of vector diffraction theory as applied to laser beams are discussed in "Electromagnetic Diffraction Theory Applied to Tightly Focused Laser Beams (TUFF4)" by F. F. Geyer, Conference on Laser And Electro-Optical Systems, *TECHNICAL DIGEST*, Feb. 26–28, 1980, San Diego, Calif., p. 24, and measurements of the effect of vector diffraction theory on focused laser beams are disclosed in "Knife-edge Scanning of Focused Laser Beams (TUFF5)" by Donald J. Howe, Conference on Laser And Electro-Optical Systems, *TECHNICAL DIGEST*, Feb. 26–28, 1980, San Diego, Calif., p. 24. The effect of vector diffraction is illustrated in FIGS. 3a, 3b and 3c. In FIG. 3a, an input beam that is linearly polarized along the y axis (see FIG. 3b) is imaged by a well-corrected (i.e., diffraction limited), high numerical aperture lens system to form a focused spot in an image plane. Geometrical optics predicts that the circular input beam will be focused into a point of light at the focus of the lens system. Geometrical optics, however, ignores the wave nature of radiation and, in particular, the fact that radiation is diffracted by the aperture of the lens system. Scalar diffraction theory takes this type of diffraction into account, and predicts that a spot formed at the focus of the lens system will have a circular cross section. This generally circular spot is the well known Airy disc, which represents the diffraction pattern produced by passing a circular input beam through a circular lens aperture. In the vast majority of applications, geometrical optics and/or scalar diffraction theory adequately describe the performance of an optical system.

Neither of these theories, however, takes into account the state of polarization of the radiation passing through the optical system. In this regard, vector diffraction theory can be considered as a generalization of scalar diffraction theory which takes the state of polarization into account. Specifically, scalar diffraction theory assumes that the optical fields can be added arithematically, i.e., as scalars. Vector diffraction theory, on the other hand, treats the superposition of optical fields by techniques of vector addition. Under certain circumstances, which are discussed in detail below, vector diffraction theory predicts that when a beam of linearly polarized radiation having circular cross section is imaged by a well corrected lens system, the resulting image is a spot which has an elliptical, not circular, contour. Further, in the image plane the polarization vector is aligned with the major axis of the elliptical spot. This result is shown in FIG. 3c.

One of the reasons that vector diffraction effects are rarely noticed, even when working with linearly polarized light, is that such effects are significant only for lens systems having high numerical apertures. In general, vector diffraction effects will be negligible for any lens system that has a numerical aperture (defined as the sin $\alpha$, where $\alpha$ is as shown in FIG. 3a) less than about 0.5. FIGS. 4a through 4e provide a graphical illustration of the magnitude of vector diffraction effects as a function of numerical aperture. Each figure shows a plot of five contours of equal irradiance (90, 70, 50, 30 and 10 percent of the maximum image irradiance) in the image plane of the optical system shown in FIG. 3a. For the case shown in FIG. 4a (N.A.=0), the circular symmetry of the focused spot is maintained. As the numerical aperture is increased to 0.5, a slight deviation from circular symmetry is observed, but only for the low irradiance contours. Once the numerical aperture is increased to 0.87, however, the circular symmetry is lost and the contours of equal irradiance assume a generally elliptical contour, with the direction of polarization (which is along the y-axis) being aligned along the major axis. This effect becomes even more pronounced as the numerical aperture reaches 1.0.

For the most part, vector diffraction effects have been regarded as being only of theoretical interest. In accordance with the present invention, however, vector diffraction effects are put to practical use to correct for the anamorphicity of a diode laser output beam, or other beam of optical radiation. FIG. 5a shows an optical system in accordance with one embodiment of the present invention. The emitting face of a diode laser is located at the focal point of a first lens system $L_1$. (The diode laser and the lens $L_1$ can be manufactured as a unit.) Because the output beam of a diode laser has a gaussian intensity profile, it is not sharply defined. It is thus necessary to adopt a convention for specifying beam size. Consistent with the standard practice for measuring beam divergence angles (as discussed above), beam size will be defined in terms of its half power contour. In order for the lens system $L_1$ not to truncate the diode laser output beam past its half power contour, the numerical aperture of the lens system $L_1$ should be greater than or equal to the size of the largest beam divergence angle (shown as $\beta$ in FIG. 5a). For the previous example of a diode laser having a beam divergence of 25°×35°, the numerical aperture of the lens system $L_1$ should be equal to sin $\beta$, or about 0.6 (sin 35°=0.57).

FIG. 5b shows the diode laser output beam in cross section. It will be noted that the beam is linearly polarized along the major axis (y-axis) of the beam, as discussed above. The lens system $L_1$ collimates this output beam, producing a beam of collimated radiation having a cross section as shown in FIG. 5c.

The beam then passes through a half wave plate (hereinafter $\lambda/2$ wave plate). A $\lambda/2$ wave plate is an optical device made of a slab of a doubly refracting crystal such as calcite or mica. The crystal slab is cut in such a way that an axis of maximum index $n_1$ (slow axis) and an axis of minimum index $n_2$ (fast axis) lie at right angles to one another in the plane of the crystal slab. If the crystal thickness is d, then the optical thickness is $n_1 d$ for light polarized in the direction of the slow axis, and $n_2 d$ for light polarized in the direction of the fast axis. For a $\lambda/2$ wave plate, d is chosen such that the difference $n_1 d - n_2 d$ is equal to $\frac{1}{2}$ wavelength, i.e., $$d = \lambda/2(n_1 - n_2)$$

The $\lambda/2$ plate in FIG. 5a is oriented such that the plane of polarization of the collimated beam bisects the angle between the fast and slow axis. As a result, the plane of polarization is rotated through an angle of 90°, as shown in FIG. 5d, to become aligned with the major axis (now the x axis) of the collimated beam.

The beam, in its present polarization state, is then brought to a focus by lens system $L_2$. Scalar diffraction theory predicts that the beam contour shown in FIG. 5d would be transformed at the image plane to an elliptically shaped beam contour similar to the original beam contour shown in FIG. 5b (although at a different magnification). This result is shown by the broken contour line in FIG. 5e. It is found, however, that the effects of vector diffraction are such as to cause the focused spot to be wider than predicted by scalar diffraction theory along an axis parallel to the direction of polarization (i.e., along the x axis), than along an axis that is perpendicular to the direction of polarization. This result can be explained by interpreting the effects of vector diffraction as causing a spot (focused under the conditions discussed above) to be wider along its direction of polarization than would be predicted by scalar diffraction theory. Thus, by an effect similar to that which causes a circular beam to be focused to an elliptical spot (FIGS. 3a, 3b and 3c), an elliptical beam can be focused to a circular spot (FIGS. 5a through 5e). By properly selecting the amount of widening which results from vector diffraction effects, a circular spot is produced in the image plane which is represented by the solid contour line in FIG. 5e. (Were the $\lambda/2$ wave plate omitted from the optical system shown in FIG. 5a, vector diffraction effects would still be present but would cause the focused spot to be even more elliptical in contour than the original beam.)

A parameter which can be adjusted to control the amount of widening produced by vector diffraction effects is the numerical aperture of the lens system $L_2$. As discussed in connection with FIGS. 4a through 4e, a high numerical aperture lens exhibits more pronounced vector diffraction effects than a low numerical aperture lens. It has been found that if the input beam to the lens system $L_2$ has an anamorphicity that is characterized by an eccentricity $\epsilon$ ($\epsilon$ being defined as the ratio of the minor axis to the major axis of the beam cross section), then the numerical aperture needed to result in a beam of generally circular cross section is as specified by the following Table:

TABLE

| Numerical Aperture | $\epsilon$ |
|---|---|
| .5 | .95 |
| .65 | .91 |
| .85 | .88 |
| .95 | .75 |

It is seen from the above data that, at least for optical systems in air, beam eccentricities much greater than about 0.7 are impossible to completely correct by this technique since the maximum possible numerical aperture a lens system in air can have is 1.0. Even if the beam eccentricity is too large to be completely corrected by vector diffraction effects, however, it is still useful in many applications to provide partial correction. A beam which initially has an eccentricity of 0.5, for example, could be corrected to an eccentricity of 0.7 by choosing the lens system $L_2$ to have a numerical aperture of about 0.85.

Because it is frequently inconvenient to change the numerical aperture of a lens system, it is often desirable to vary the magnitude of the vector diffraction effects in some other manner. In accordance with the present invention, the orientation of the $\lambda/2$ plate is made adjustable by angular adjustment means 11, thereby allowing the angle through which the polarization vector E is rotated to be varied continuously from 0° to 90° by rotating the $\lambda/2$ plate through an angle of 45°. In the optical system shown in FIG. 5a, orienting the λ/2 plate to provide 0° of rotation of the polarization vector results in a vector diffraction effect that, as discussed above, increases the elliptical nature of the focused spot, while an orientation of the λ/2 plate that provides a 90° rotation of the polarization vector results in maximum shortening of the major axis of the focused spot. Varying the angle of orientation between these extremes produces a corresponding change in the magnitude of the vector diffraction effect.

The invention has been described in detail with particular reference to certain preferred embodiments thereof, but it will be understood that variations and modifications can be effected within the spirit and scope of the invention. For example, rather than use a λ/2 plate to rotate the direction of polarization, a three mirror polarization rotator, or other suitable optical means, can be used.

What is claimed is:

1. Apparatus comprising:
   (a) a radiation source for producing an anamorphic output beam of optical radiation that is linearly polarized along its major axis;
   (b) means for collimating said output beam of radiation;
   (c) means for rotating the direction of polarization of said collimated beam of radiation to produce a polarization rotated, collimated beam of radiation; and
   (d) an optical lens having a numerical aperture greater than about 0.5 for focusing said polarization rotated, collimated beam of radiation to a spot,
   thereby forming a focused spot of optical radiation that is less anamorphic than the output beam of said radiation source.

2. Apparatus as claimed in claim 1 wherein said polarization rotating means includes means for varying the amount by which the direction of polarization of said collimated beam is rotated, thereby enabling the anamorphicity of said focused spot to be varied.

3. Apparatus as claimed in claim 1 wherein said polarization rotating means includes means for rotating the direction of polarization of said collimated beam by about 90 degrees, thereby providing maximum anamorphicity correction.

4. Apparatus as claimed in claim 1 wherein said polarization rotating means comprises a half-wave plate disposed in the optical path of said collimated beam of radiation.

5. Apparatus as claimed in claim 4 further comprising means for adjusting the angular orientation of said half-wave plate relative to the direction of polarization of said collimated beam, thereby enabling the anamorphicity of said focused spot to be varied.

6. Apparatus as claimed in claim 4 wherein said half-wave plate is adapted to be disposed at an angular orientation such that the direction of polarization of said collimated beam bisects the fast and slow axis of said half-wave plate, thereby providing maximum anamorphicity correction.

7. Apparatus comprising:
   (a) a diode laser;
   (b) means for collimating the output beam produced by said diode laser;
   (c) means for rotating the direction of polarization of said collimated beam of radiation to produce a polarization rotated, collimated beam of radiation; and
   (d) an optical lens having a numerical aperture greater than about 0.5 for focusing said polarization rotated, collimated beam of radiation to a spot,
   thereby forming a focused spot of optical radiation that is less anamorphic than the output beam of said diode laser.

8. Apparatus as claimed in claim 7 wherein said polarization rotating means includes means for varying the amount by which the direction of polarization of said collimated beam is rotated, thereby enabling the anamorphicity of said focused spot to be varied.

9. Apparatus as claimed in claim 7 wherein said polarization rotating means includes means for rotating the direction of polarization of said collimated beam by about 90 degrees, thereby providing maximum anamorphicity correction.

10. Apparatus as claimed in claim 7 wherein said polarization rotating means comprises a half-wave plate disposed in the optical path of said collimated beam of radiation.

11. Apparatus as claimed in claim 10 further comprising means for adjusting the angular orientation of said half-wave plate relative to the direction of polarization of said collimated beam, thereby enabling the anamorphicity of said focused spot to be varied.

12. Apparatus as claimed in claim 10 wherein said half-wave plate is disposed at an angular orientation such that the direction of polarization of said collimated beam bisects the fast and slow axis of said half-wave plate, thereby providing maximum anamorphicity correction.

13. Apparatus as claimed in claim 7 wherein said collimation means includes an optical lens disposed such that said diode laser is located at a focal point.

14. Apparatus as claimed in claim 13 wherein said polarization rotating means comprises a half-wave plate disposed in the optical path of said collimated beam of radiation.

15. Apparatus as claimed in claim 14 further comprising means for adjusting the angular orientation of said half-wave plate relative to the direction of polarization of said collimated beam, thereby enabling the anamorphicity of said focused spot to be varied.

16. Apparatus as claimed in claim 14 wherein said half-wave plate is disposed at an angular orientation such that the direction of polarization of said collimated beam bisects the fast and slow axis of said half-wave plate, thereby providing maximum anamorphicity correction.

17. Apparatus for use with a source of optical radiation that produces an anamorphic output beam that is linearly polarized along its major axis, said apparatus comprising:
   (a) a first lens for collimating the output beam from said source of optical radiation to produce an anamorphic beam of collimated radiation that is linearly polarized along its minor axis;
   (b) a half-wave plate disposed in the path of said collimated beam for rotating the plane of polarization by 90° so that said collimated beam of radiation is linearly polarized along its major axis; and
   (c) a second lens for forming a focused spot of radiation in an image plane located at the focus of said second lens, said second lens having a numerical aperture greater than or equal to 0.5 so that said focused spot is less anamorphic than the output beam produced by said source of radiation.

18. Apparatus comprising:

(a) a first lens;
(b) a diode laser for producing an anamorphic beam of radiation that is linearly polarized along its major axis, said diode laser beam disposed at the focus of said first lens so that said output beam is collimated by said first lens to produce an anamorphic collimated beam of radiation that is linearly polarized along its minor axis;
(c) means disposed in the optical path of said collimated beam of radiation for rotating the plane of polarization by about 90° so that said collimated beam of radiation is linearly polarized along its major axis; and
(d) a second lens for focusing the collimated beam of radiation from said polarization rotating means into a focused spot, said second lens having numerical aperture greater than or equal to 0.5, so that said focused spot is less anamorphic than the output beam produced by said diode laser.

19. A method for reducing the anamorphicity of an anamorphic beam of optical radiation that is linearly polarized along its major axis, said method comprising the steps of:
    collimating said beam of optical radiation;
    rotating the direction of polarization of said collimated beam of radiation to produce a polarization rotated, collimated beam of radiation; and
    focusing said polarization rotated, collimated beam of radiation to a spot using an optical lens having a numerical aperture greater than about 0.5.

20. A method as claimed in claim 19 wherein the direction of polarization of said collimated beam is rotated by about 90 degrees, thereby providing maximum anamorphicity correction.

21. A method for reducing the anamorphicity of an anamorphic output beam of a diode laser, said method comprising the steps of:
    collimating the output beam of said diode laser;
    rotating the direction of polarization of said collimated beam to produce a polarization rotated, collimated beam; and
    focusing said polarization rotated, collimated beam to a spot using an optical lens having a numerical aperture greater than about 0.5.

* * * * *